(12) United States Patent
Zhang et al.

(10) Patent No.: US 11,346,807 B2
(45) Date of Patent: May 31, 2022

(54) PULSED SAMPLING-BASED ION MOBILITY SPECTROMETER AND SNIFFER

(71) Applicant: NUCTECH COMPANY LIMITED, Beijing (CN)

(72) Inventors: Qingjun Zhang, Beijing (CN); Yuanjing Li, Beijing (CN); Zhiqiang Chen, Beijing (CN); Jianmin Li, Beijing (CN); Yinong Liu, Beijing (CN); Yaohong Liu, Beijing (CN); Lili Yan, Beijing (CN); Biao Cao, Beijing (CN); Weiping Zhu, Beijing (CN); Ge Li, Beijing (CN); Qiufeng Ma, Beijing (CN); Qi Mao, Beijing (CN); Nan Bai, Beijing (CN)

(73) Assignee: Nuctech Company Limited, Beijing (CN)

( * ) Notice: Subject to any disclaimer, the term of this patent is extended or adjusted under 35 U.S.C. 154(b) by 270 days.

(21) Appl. No.: 16/626,767

(22) PCT Filed: Jun. 12, 2019

(86) PCT No.: PCT/CN2019/090947
§ 371 (c)(1),
(2) Date: Dec. 26, 2019

(87) PCT Pub. No.: WO2020/048178
PCT Pub. Date: Mar. 12, 2020

(65) Prior Publication Data
US 2021/0404988 A1 Dec. 30, 2021

(30) Foreign Application Priority Data

Sep. 6, 2018 (CN) .......................... 201811040529.0

(51) Int. Cl.
H01J 49/00 (2006.01)
G01N 27/622 (2021.01)
G01N 1/22 (2006.01)

(52) U.S. Cl.
CPC ......... G01N 27/622 (2013.01); G01N 1/2247 (2013.01)

(58) Field of Classification Search
CPC ..... G01N 27/622; G01N 1/2247; H01J 49/00; H01J 49/02; H01J 49/0422; H01J 49/06; H01J 49/062; H01J 49/063
(Continued)

(56) References Cited

U.S. PATENT DOCUMENTS 5,736,739 A * 4/1998 Uber .................... G01N 27/624
250/288
2009/0114811 A1* 5/2009 Landgraf ............. G01N 27/622
250/288

FOREIGN PATENT DOCUMENTS

CN 102072933 A 5/2011
CN 203561618 U 4/2014
(Continued)

OTHER PUBLICATIONS

International Search Report and Written Opinion of the International Searching Authority for International Patent Application No. PCT/CN2019/090947 dated Jul. 29, 2019, 10 pages.
(Continued)

Primary Examiner — Jason L McCormack
(74) Attorney, Agent, or Firm — Merchant & Gould P.C.

(57) ABSTRACT

There are provided an ion mobility spectrometer and a sniffer. The ion mobility spectrometer includes: an ion migration tube; a sampling gas path having a sampling device configured to temporarily store a sample gas collected by a sampling head in a sampling pipe; a sample
(Continued)

introduction gas path having two ends in communication with the gas inlet and outlet of the ion migration tube respectively, and configured to introduce a carrier gas within the ion migration tube into the sampling pipe and to carry a sample gas temporarily stored in the sampling pipe into the ion migration tube; and a valve assembly configured to only allow gas to flow from the sampling device to the sampling pipe in a sampling state, and to only allow gas to flow from the ion migration tube through the sampling pipe back to the ion migration tube in a sample introduction state.

20 Claims, 5 Drawing Sheets

(58) Field of Classification Search
USPC .......................................... 250/281, 282, 288
See application file for complete search history.

(56) References Cited

FOREIGN PATENT DOCUMENTS

| CN | 206258418 U | 6/2014 |
|---|---|---|
| CN | 208819830 U | 5/2019 |
| DE | 19938392 A1 | 2/2001 |
| DE | 69720419 T2 | 3/2004 |
| DE | 102007052802 A1 | 5/2009 |
| DE | 202009007714 U1 | 8/2009 |
| DE | 102017222180 A1 | 6/2018 |
| WO | 2004/109254 A2 | 12/2004 |

OTHER PUBLICATIONS

German Office Action for DE Application No. 11 2019 004 472.9 dated Jan. 26, 2022 (8 pages with English translation).

* cited by examiner

PULSED SAMPLING-BASED ION MOBILITY SPECTROMETER AND SNIFFER

CROSS-REFERENCE TO RELATED APPLICATION

This application is a Section 371 National Stage Application of International Application No. PCT/CN2019/090947, filed on Jun. 12, 2019, entitled "Pulsed Sampling-Based Ion Mobility Spectrometer and Sniffer", which claims priority to Chinese Application No. 201811040529.0, filed on Sep. 6, 2018 in the National Intellectual Property Administration of China, incorporated herein by reference in their entirety.

FIELD OF THE DISCLOSURE

The present disclosure generally relates to the field of detection technologies, and particularly, to a pulsed sampling-based ion mobility spectrometer, and a sniffer comprising the ion mobility spectrometer.

DESCRIPTION OF THE RELATED ART

Ion mobility spectrometer is widely used in various fields such as military, National Defense, industries, environment, clinical diagnostic and the like due to its advantages such as small size, low power consumption, portability, fast detection speed, high sensitivity, and industrialization. External environment background entering the ion mobility spectrometer will interfere with a signal. In order to isolate the external environment background from entering the ion mobility spectrometer, the conventional ion mobility spectrometer often adopts a membrane type sample introduction method. The membrane type sample introduction method is mainly divided into three modes including a sample introduction mode based on wiping of a sampling membrane, a sample introduction mode based on suction of a sampling membrane and a sample introduction mode based on direct thermal desorption of a sampling membrane. Although a semi-permeable membrane can block water, dust or the like in the environmental background during the sample introduction, so as to improve environmental adaptability of the ion mobility spectrometer, most of samples will be blocked at the same time by the semi-permeable membrane and thus are kept outside of the semi-permeable membrane, thereby affecting detection sensitivity of the ion mobility spectrometer.

The semi-permeable membrane will also block most of samples to be detected from passing therethrough while blocking the environment background from entering the ion mobility meter and from adversely affecting and contaminating the ion mobility spectrometer, which reduces the detection sensitivity of the ion mobility spectrometer.

SUMMARY

According to aspects of embodiments of the present disclosure, there are provided a pulsed sampling-based ion mobility spectrometer and a sniffer, for improving the detection sensitivity of the ion mobility spectrometer.

In an embedment according to an aspect of the present disclosure, there is provided a pulsed sampling-based ion mobility spectrometer, comprising:

an ion migration tube provided with a gas inlet into which a sample gas and a carrier gas flow, a gas outlet from which a gas flows out and a migration gas inlet into which a migration gas flow;

a sampling gas path in which a sampling device is arranged, the sampling device comprising a sampling head and a sampling pipe, the sampling head having an outlet in communication with an inlet of the sampling pipe, the sampling gas path being configured to temporarily store the sample gas collected by the sampling head into the sampling pipe;

a sample introduction gas path having two ends in communication with the gas inlet and the gas outlet of the ion migration tube respectively, the sampling pipe being connected in parallel to the sample introduction gas path, the sample introduction gas path being configured to introduce the carrier gas within the ion migration tube into the sampling pipe and to carry the sample gas temporarily stored in the sampling pipe into the ion migration tube; and a valve assembly configured to only allow gas to flow from the sampling device to the sampling pipe in a sampling state, and to only allow gas to flow from the ion migration tube through the sampling pipe back to the ion migration tube in a sample injecting state.

In the ion mobility spectrometer according to an embodiment of the present disclosure, the valve assembly comprises a first three-way valve having a first port in communication with the outlet of the sampling device, a second port in communication with the gas outlet of the ion migration tube and a third port in communication with the inlet of the sampling pipe.

In the ion mobility spectrometer according to an embodiment of the present disclosure, the ion mobility spectrometer further comprises a circulation gas path including a migration gas circulation path and a sample introduction carrier gas circulation path, the migration gas circulation path having two ends in communication with the gas outlet and the migration gas inlet of the ion migration tube respectively so as to introduce the migration gas from a rear end into the ion migration tube, the sample introduction carrier gas circulation path having two ends in communication with the gas outlet and the gas inlet of the ion migration tube respectively so as to introduce the carrier gas from a rear end into the ion migration tube.

In the ion mobility spectrometer according to an embodiment of the present disclosure, the ion migration tube includes an integrated dual-mode full-ceramic migration tube, and there are provided two said migration gas circulation paths having outlet ends in communication with migration gas inlets of two ion migration tubes of the integrated dual-mode full-ceramic migration tube in a one-to-one correspondence.

In the ion mobility spectrometer according to an embodiment of the present disclosure, a first flow control valve is arranged in the migration gas circulation path to control a gas flow in the migration gas circulation path.

In the ion mobility spectrometer according to an embodiment of the present disclosure, the ion mobility spectrometer further comprises a first pump provided downstream of the ion migration tube in a gas flow direction and configured to drive a gas flow.

In the ion mobility spectrometer according to an embodiment of the present disclosure, the ion mobility spectrometer further comprises a first buffer chamber arranged in series in the sample introduction gas path and between the ion migration tube and the first pump. In the ion mobility spectrometer according to an embodiment of the present disclosure, the ion mobility spectrometer further comprises a second flow control valve arranged in series in the sample introduction gas path and between the ion migration tube and the first buffer chamber.

In the ion mobility spectrometer according to an embodiment of the present disclosure, the ion mobility spectrometer further comprises a second buffer chamber arranged in series in the sample introduction gas path and between the first pump and the first three-way valve.

In the ion mobility spectrometer according to an embodiment of the present disclosure, an inlet end of the migration gas circulation path and an inlet end of the sample introduction carrier gas circulation path are both in communication with a gas exhaust port of the second buffer chamber, and the second port of the first three-way valve is in communication with the gas exhaust port of the second buffer chamber.

In the ion mobility spectrometer according to an embodiment of the present disclosure, the valve assembly further comprises a second three-way valve, the inlet end of the sample introduction carrier gas circulation path is in communication with the sample introduction gas path via the second three-way valve at a connection position between the second buffer chamber and the first three-way valve, and the second three-way valve is configured to only allow a part of the gas to flow from the second buffer chamber through the sample introduction gas path to the sampling pipe in the sample injecting state, and to only allow the gas to flow from the second buffer chamber through the sample introduction carrier gas circulation path to the ion migration tube in an internal circulation state.

In the ion mobility spectrometer according to an embodiment of the present disclosure, the ion mobility spectrometer further comprises a first purification filter arranged in the sample introduction gas path between the first pump and the second buffer chamber and configured to filter gas flowing through the sample introduction gas path.

In the ion mobility spectrometer according to an embodiment of the present disclosure, the ion mobility spectrometer further comprises a gas replenishing/discharging path for replenishing gas into the ion migration tube or for discharging gas from the ion mobility spectrometer, the gas replenishing/discharging path having a first end in communication with the gas outlet of the ion migration tube and a second end in communication with an external environment.

In the ion mobility spectrometer according to an embodiment of the present disclosure, a second purification filter is arranged in the gas replenishing/discharging path.

In the ion mobility spectrometer according to an embodiment of the present disclosure, the valve assembly further comprises a third three-way valve, the first end of the gas replenishing/discharging path is in communication with the sample introduction gas path via the third three-way valve at a connection position between the first pump and the first purification filter, and the third three-way valve is configured to only allow gas to flow from the first pump to the first purification filter in the sample injecting state, to only allow gas to flow from the first pump to the second purification filter in a gas discharging state, and to only allow gas to flow from the second purification filter to the first pump in a gas replenishing state.

In the ion mobility spectrometer according to an embodiment of the present disclosure, a water trap filter is further arranged in the gas replenishing/discharging path between the second purification filter and the external environment.

In the ion mobility spectrometer according to an embodiment of the present disclosure, a second pump is further arranged in the sampling gas path to drive gas flow.

In the ion mobility spectrometer according to an embodiment of the present disclosure, the ion mobility spectrometer further comprises a gas suctioning and cleaning path having two ends being in communication with an outlet of the second pump and an external environment respectively, the second pump being arranged at a downstream position in the sampling gas path in a gas flow direction; the valve assembly further comprises a fourth three-way valve arranged in the gas suctioning and cleaning path between the second pump and the sampling pipe, the fourth three-way valve being configured to only allow gas to flow from the sampling pipe to the second pump in a gas suctioning and cleaning state and to only allow gas to flow from the sampling pipe to the ion migration tube in the sample injecting state; and a third purification filter is arranged in the gas suctioning and cleaning path, and the gas suctioning and cleaning path is configured such that in a gas suctioning and cleaning state, an clean air flow flows through the sampling gas path and is discharged after being filtered by the third purification filter.

In the ion mobility spectrometer according to an embodiment of the present disclosure, the ion mobility spectrometer further comprises a gas blowing and cleaning path having two ends being in communication with an inlet of the sampling pump and an external environment respectively, a fourth purification filter is arranged in the gas blowing and cleaning path, and the gas blowing and cleaning path is configured such that in a gas blowing and cleaning state, a gas flow filtered by the fourth purification filter flows to the sampling gas path so as to clean sampling gas path.

In the ion mobility spectrometer according to an embodiment of the present disclosure, the valve assembly further comprises a fifth three-way valve arranged in the sampling gas path between the second pump and the fourth three-way valve, and the fifth three-way valve is configured to only allow gas to flow from the sampling pipe to the second pump in the gas suctioning and cleaning state, and to only allow gas to flow from the second pump to the sampling pipe in the gas blowing and cleaning state.

In the ion mobility spectrometer according to an embodiment of the present disclosure, the sampling device is made of a metal tube.

In the ion mobility spectrometer according to an embodiment of the present disclosure, the sampling device is provided with a heater configured for ensuring an internal temperature of the sampling device is not less than a preset temperature.

In the ion mobility spectrometer according to an embodiment of the present disclosure, a microporous filter is disposed at the inlet of the sampling device and configured for filtering impurity in the sample gas.

According to an embodiment of another aspect of the present disclosure, there is provided a sniffer comprising the ion mobility spectrometer described above.

DETAILED DESCRIPTION OF EXEMPLARY EMBODIMENTS

Figure 1:
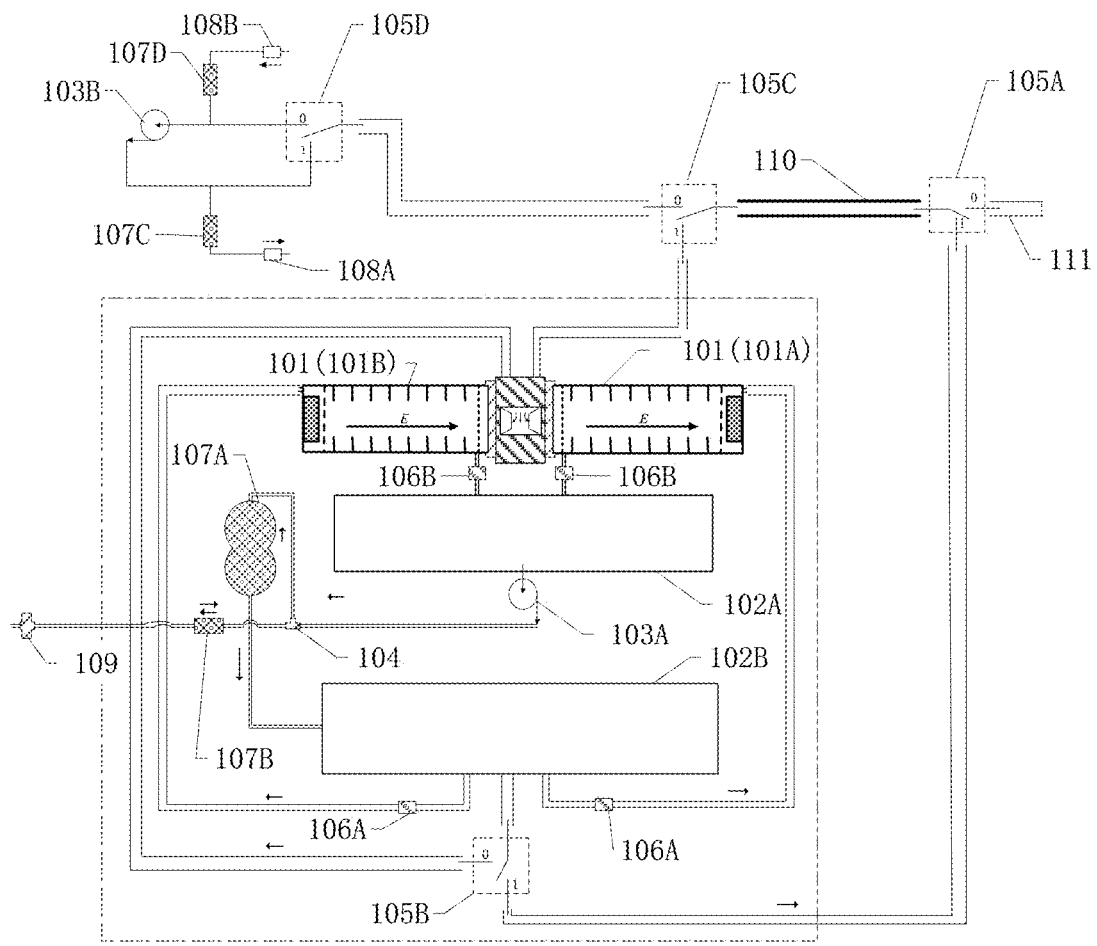
FIG. 1 is a structural schematic diagram of a pulsed sampling-based ion mobility spectrometer according to an embodiment of the present disclosure.

Although various modifications and alternative forms are allowed in the present disclosure, exemplary embodiments of the present disclosure will be shown by way of example in the attached drawings and will be described in detail herein. However, it should be understood, the attached drawings and the detailed description are not intended to limit the present disclosure to the specific forms of the disclosure, but rather to cover all modifications, equivalents, and alternative forms in the spirit and scope of the present disclosure defined by the appended claims and. The attached drawings are for illustration and are not drawn to scale.

Terms such as "first" and "second" are used in this specification, are not intended to sort or represent importance or primary and secondary relationships, and rather, are used to distinguish between different components.

An object of the present disclosure is to provide a pulsed sampling-based ion mobility spectrometer, including: an ion migration tube provided with a gas inlet into which a sample gas and a carrier gas flow, a gas outlet from which a gas flows out and a migration gas inlet into which a migration gas flows; a sampling gas path in which a sampling device is arranged, the sampling device including a sampling head and a sampling pipe, the sampling head having an outlet in communication with an inlet of the sampling pipe, the sampling gas path being configured to temporarily store the sample gas collected by the sampling head in the sampling pipe; a sample introduction gas path having two ends in communication with the gas inlet and the gas outlet of the ion migration tube respectively, the sampling pipe being connected in parallel to the sample introduction gas path, the sample introduction gas path being configured to introduce the carrier gas within the ion migration tube into the sampling pipe and to carry the sample gas temporarily stored in the sampling pipe into the ion migration tube; and a valve assembly configured to only allow gas to flow from the sampling device to the sampling pipe in a sampling state, and to only allow gas to flow from the ion migration tube through the sampling pipe back to the ion migration tube in a sample injecting state.

According to the present disclosure, one end of the sampling pipe is connected respectively with the sampling device and the sample introduction gas path via the valve assembly, such that, by control of the valve assembly, the gas sample collected by the sampling device flows into the sampling pipe in a sampling state, and the gas within the ion migration tube enters sampling pipe via the valve assembly and carries the gas sample temporarily stored in the sampling pipe into the ion migration tube in a sample intake or introduction state. By controlling fast switching of the valve assembly by for example a controller, the pulsed sampling can be achieved during the fast switching on and off of the sampling gas path, the pulsed sampling time can be as low as an order of milliseconds, and the minimum sampling amount per single pulse can be as low as an order of 10 microliters (in a case having a sampling gas flow of 1 L/min). This pulsed sampling type direct intake mode can not only improve a sensitivity of a trace sniffer but also minimize the impact of harsh external detection environment on detection accuracy of ion migration to the greatest extent.

FIG. 1 is a structural schematic diagram of a pulsed sampling-based ion mobility spectrometer according to an embodiment of the present disclosure.

In this embodiment, the valve assembly includes a first three-way valve 105A, for example a two-position three-way solenoid valve. The first three-way valve 105A has a first port in communication with an outlet of a sampling device 111, a second port in communication with a gas outlet of a ion migration tube 101 and a third port in communication with an inlet of a sampling pipe 110. By provision of the three-way valve, accuracy in fast switching on and off timing of the sampling gas path can be further improved, enabling pulsed sampling.

It is noted that it will be understood by those skilled in the art, in some other embodiment of the present disclosure, the valve assembly may also include a first valve (for example, a first solenoid valve) and a second valve (for example, a second solenoid valve), the first valve has an inlet in communication with the outlet of the sampling device 111, and an outlet in communication with the inlet of the sampling pipe 110, and the second valve has an inlet in communication with the gas outlet of the ion migration tube 101 and an outlet in communication with the inlet of the sampling pipe 110. By accurately controlling the first valve and the second valve to be fast switched, fast switching on and off of the sampling gas path can also be achieved, enabling pulsed sampling.

As shown in FIG. 1 to FIG. 5, the ion migration tube 101 is provided with a gas inlet through which a carrier gas and a gas sample enters the ion migration tube 101, a gas outlet through which a gas flows out from the ion migration tube 101, and a migration gas inlet through which a migration gas enters the ion migration tube 101. The ion migration tube 101 is divided by an ion gate into an ionization reaction zone and a gas migration zone, and a detector is provided at an end of the gas migration zone opposite to the ionization reaction zone so as to detect ions.

Figure 2:
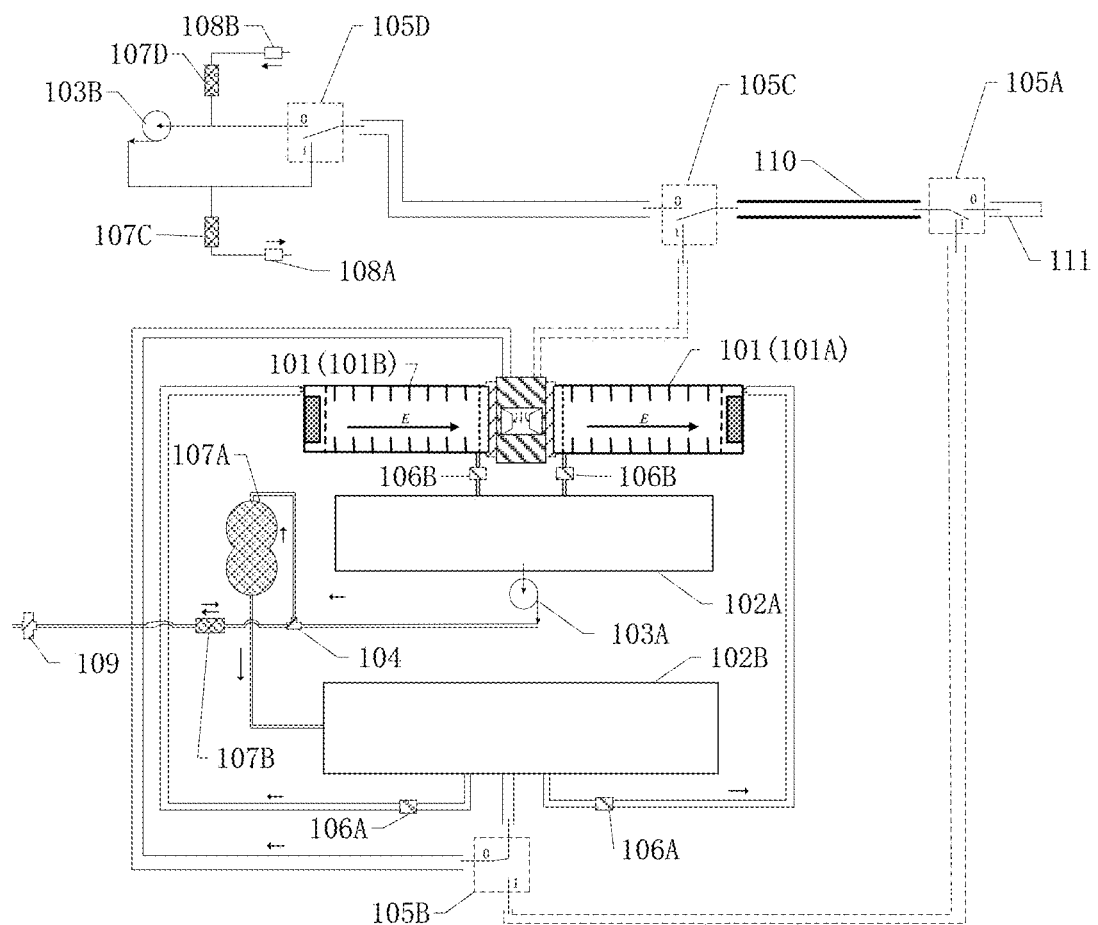
FIG. 2 is a structural schematic diagram of the pulsed sampling-based ion mobility spectrometer shown in FIG. 1 in an internal circulation state.

As shown in FIG. 2, the ion mobility spectrometer further includes a circulation gas path, the circulation gas path includes a migration gas circulation path and a sample introduction carrier gas circulation path, two ends of the migration gas circulation path are in communication with the gas outlet and the migration gas inlet of the ion migration tube 101 respectively so as to introduce the migration gas from a rear end into the gas migration zone of the ion migration tube 101; and two ends of the sample introduction carrier gas circulation path are in communication with the gas outlet and the gas inlet of the ion migration tube 101 respectively so as to introduce the carrier gas from a rear end into the ionization reaction zone of the ion migration tube.

Specifically in this embodiment, the ion migration tube 101 includes an integrated dual-mode full-ceramic migration tube, which includes a first the ion migration tube 101A and a second the ion migration tube 101B. Correspondingly, there are provided two migration gas circulation paths having outlet ends in communication with migration gas inlets of two ion migration tubes 101 of the integrated dual-mode full-ceramic migration tube in a one-to-one correspondence.

It is noted that it will be understood by those skilled in the art, in some other embodiment of the present disclosure, the ion migration tube 101 may include any suitable ion migration tubes 101, or may also include only one single ion migration tube 101.

As shown in FIG. 1 to FIG. 5, in one embodiment, a first flow control valve 106A is arranged in the migration gas circulation path, and configured to control a gas flow in the migration gas circulation path so that it may be selected by a user that a detection may be performed only in a negative mode, or only in a positive mode, or simultaneous detections may be performed in both the negative and positive modes, by balancing or cutting off a non-corresponding detection mode according to the electrophilic property or the nucleophilic property of the detected sample.

In this embodiment, as shown in FIG. 1 to FIG. 5, the ion mobility spectrometer further includes a first pump 103A, and the first pump 103A is provided downstream of the ion migration tube 101 in a gas flow direction, and configured to drive a gas flow, for example in the sample injecting state or in an internal circulation state. In an embodiment, the first pump 103A is a diaphragm pump. Further, the ion migration tube gas path further includes a first buffer chamber 102A connected in series with the sample introduction gas path between the ion migration tube 101 and the first pump 103A, and configured to reduce influence of a pulsed gas flow from the first pump 103A on a gas flow within the ion mobility spectrometer. In addition, the ion mobility spectrometer further includes a second buffer chamber 102B connected in series with the sample introduction gas path and between the first pump 103A and the first three-way valve 105A, and configured to further reduce influence of the pulsed gas flow from the first pump 103A on the gas flow within the ion mobility spectrometer. In one embodiment, a buffer membrane is provided on at least a portion of at least one side of the first buffer chamber 102A or the second buffer chamber 102B so as to enhance buffering effect. In one embodiment, the buffer membrane has a good flexible or stretchable characteristic. The material of the buffer membrane includes but is not limited to latex.

To improve selective detection of samples implemented by the instrument, a second flow control valve 106B is arranged in the sample introduction gas path and between the ion migration tube 101 and the first buffer chamber 102A, so that it may be selected by a user that a detection may be performed only in a negative mode, or only in a positive mode, or simultaneous detections may be performed in both the negative and positive modes, by balancing or cutting off a non-corresponding detection mode according to the electrophilic property or the nucleophilic property of the detected sample.

As shown in FIG. 2, the inlet end of the migration gas circulation path and the inlet end of sample introduction carrier gas circulation path are both in communication with a gas exhaust port of the second buffer chamber 102B, and the second port of the first three-way valve 105A is in communication with the gas exhaust port of the second buffer chamber 102B (for example, via the second three-way valve 105B).

Furthermore, the valve assembly further includes the second three-way valve 105B, for example, a two-position three-way solenoid valve. The inlet end of the sample introduction carrier gas circulation path is in communication with the sample introduction gas path via the second three-way valve 105B at a connection position between the second buffer chamber 102B and the first three-way valve 105A. The second three-way valve 105B is configured to only allow a part of the gas to flow from the second buffer chamber 102B through the sample introduction gas path to the sampling pipe 110 in the sample injecting state, and to only allow the gas to flow from the second buffer chamber 102B through the sample introduction carrier gas circulation path to the ion migration tube 101 in an internal circulation state. That is, via the second three-way valve 105B, the sample introduction gas path may be in selective communication with the sample introduction carrier gas circulation path.

Moreover, the ion mobility spectrometer further includes a first purification filter 107A arranged in the sample introduction gas path and configured to filter gas passing through the sample introduction gas path. In this embodiment, the first purification filter 107A is located between the first pump 103A and the second buffer chamber 102B. As such, both the gas flowing out from the gas outlet of the ion migration tube 101 through the sample introduction gas path to the sampling pipe 110 and the gas circulated through the migration gas circulation path and the sample introduction carrier gas circulation path back to the ion migration tube 101 can enter the first purification filter 107A after being buffered in the first buffer chamber 102A, and then is buffered in second buffer chamber 102B after being filter by the first purification filter 107A, thereby avoiding providing a further purification filter and buffer chamber in the circulation gas path, saving manufacturing costs. It is noted that it will be understood by those skilled in the art, in some other embodiment of the present disclosure, the first purification filter 107A may also be disposed at other position in the sample introduction gas path, for example, at a position between the first buffer chamber 102A and the gas outlet of the ion migration tube 101.

Furthermore, the ion mobility spectrometer further includes a gas replenishing/discharging path for replenishing gas into the ion migration tube 101 or for discharging gas from the ion migration tube 101, and the gas replenishing/discharging path has a first end in communication with the gas outlet of the ion migration tube 101 and a second end in communication with an external environment. By providing the gas replenishing/discharging path, automatic gas replenishing and discharging of the ion migration tube 101 may be implemented according to changes in environment, microsampling, temperature of the ion migration tube 101 itself, or the like, thereby enabling fast sampling.

In one embodiment, a second purification filter 107B is arranged in the gas replenishing/discharging path, and configured for purifying the gas passing through the gas replenishing/discharging path, so as to reduce adverse influence of the external environment on the ion mobility spectrometer and to enable improvement of a service life of a gas purifier (e.g., a molecular sieve, activated carbon or the like).

Also, the valve assembly further includes a third three-way valve 104, and the first end of the gas replenishing/discharging path is in communication with the sample introduction gas path via the third three-way valve 104 at a connection position between the first pump 103A and the first purification filter. The third three-way valve 104 is configured to only allow gas to flow from the first pump 103A to the first purification filter 107A in the sample injecting state, to only allow gas to flow from the first pump 103A to the external environment in a gas discharging state, and to only allow gas to flow from the second purification filter 107B to the first pump 103A in a gas replenishing state. The sample introduction gas path, the gas replenishing path and the gas discharging path may be selectively communicated with the third three-way valve 104.

According to this embodiment, a water trap filter 109 is further arranged in the gas replenishing/discharging path, and between the second purification filter 107B and the external environment so as to further reduce adverse influence of the external environment on the ion mobility spectrometer.

Figure 5:
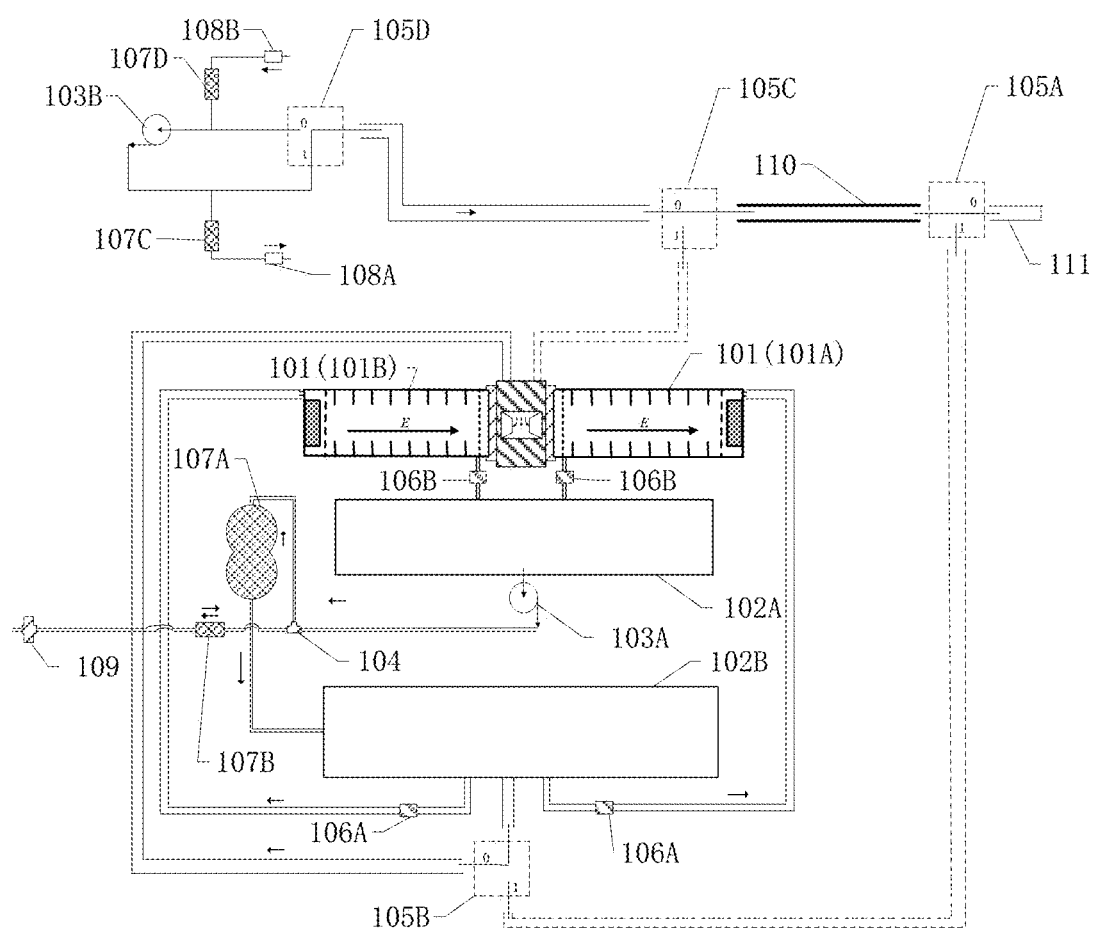
FIG. 5 is a structural schematic diagram of the pulsed sampling-based ion mobility spectrometer shown in FIG. 1 in a gas blowing and cleaning state.

As shown in FIG. 1 and FIG. 5, a second pump 103B is arranged in the sampling gas path, for driving a flow of gas in the sampling gas path.

The ion mobility spectrometer further includes a gas suctioning and cleaning path, and the gas suctioning and cleaning path has two ends in communication with an outlet of the second pump 103B and the external environment respectively; the second pump 103B is arranged at a downstream position in the sampling gas path in a gas flow direction; the valve assembly further includes a fourth three-way valve 105C arranged in the gas suctioning and cleaning path between the second pump 103B and the sampling pipe 110, and the fourth three-way valve 105C is configured to only allow gas to flow from the sampling pipe 110 to the second pump 103B in a gas suctioning and cleaning state, and to only allow gas to flow from the sampling pipe 110 to the ion migration tube 101 in the sample injecting state; a third purification filter 107C and an air resistor 108A are arranged in order in the gas suctioning and cleaning path in the gas flow direction. The gas suctioning and cleaning path is configured such that in a gas suctioning and cleaning state, an clean air flow flows through the sampling gas path and is discharged after being filtered by the third purification filter, thereby enabling cleaning of the sampling gas path. In the gas suctioning and cleaning state, the first three-way valve 105A and the fourth three-way valve 105C are each switched to a 0-position, and the second pump 103B continuously operates, such that the clean air flows through the sampling device 111, via the first three-way valve 105A, to the sampling pipe 110, and is discharged via the fourth three-way valve 105C, the second pump 103B, the third purification filter 107C and the air resistor 108A, so as to achieve cleaning of the pipes and the valve assembly through which it passes. In the sample injecting state, the first three-way valve 105A, the second three-way valve 105B, and the fourth three-way valve 105C are each switched to a 1-position, such that the sample introduction carrier gas for ion migration enters, under action of the first pump 103A, the sampling pipe 110 through the second buffer chamber 102B and via the second three-way valve 105B and the first three-way valve 105A, so as to carry the gas sample temporarily stored in the sampling pipe 110 into the ionization reaction zone within the ion migration tube 101 via the fourth three-way valve 105C.

Also, the ion mobility spectrometer further includes a gas blowing and cleaning path having two ends being in communication with an inlet of the second pump 103A and the external environment respectively. An air resistor 108B and a fourth purification filter 107D are arranged in order in the gas blowing and cleaning path in the gas flow direction, and the gas blowing and cleaning path is configured such that in a gas blowing and cleaning state, a gas flow filtered by the fourth purification filter flows to the sampling gas path so as to clean sampling gas path. Environment air passes through the air resistor 108B, is purified and filtered by the fourth purification filter 107D, and then is discharged after passing through the second pump 103B, the fourth three-way valve 105C, the sampling pipe 110, the first three-way valve 105A and the sampling device 111 so as to clean the pipes and the valve assembly through which it passes.

In one embodiment, if the ion mobility spectrometer may be provided with both of the gas suctioning and cleaning path and the gas blowing and cleaning path, the valve assembly further includes a fifth three-way valve 105D, for example a two-position three-way solenoid valve, arranged in the sampling gas path between the second pump 103B and the fourth three-way valve 105C. The fifth three-way valve 105D is configured to only allow gas to flow from the sampling pipe 110 to the second pump 103B in the gas suctioning and cleaning state, and to only allow gas to flow from the second pump 103B to the sampling pipe 110 in the gas blowing and cleaning state. Specifically, the fifth three-way valve 105D has a first port in communication with a port of the fourth three-way valve 105C, a second port in communication with the inlet of the second pump 103B, and a third port in communication with the outlet of the second pump 103B. In the gas suctioning and cleaning state, the fifth three-way valve 105D is switched to its 0-position, and at this time, the first port and the second port of the fifth three-way valve 105D are communicated with each other, such that the gas entering the second pump 103B under the action of the second pump 103B is discharged through the third purification filter 107C and the air resistor 108A. When blowing for cleaning is required, the fifth three-way valve 105D is switched to its 1-position, and at this time, the first port and the third port of the fourth of the three-way valve 105D are communicated with each other, such that the gas entering the second pump 103B through the air resistor 108B and the fourth purification filter 107D passes through the fifth three-way valve 105D and the fourth three-way valve 105C in a blowing way, to enter the sampling pipe 110 and the sampling device 111 and then is discharged, thereby achieving cleaning of the pipes and the valve assembly through which it passes.

In one embodiment, the sampling device 111 includes a metal tube, for example a stainless steel tube, having an outer diameter not more than 5 mm. The sampling device is provided with a heater configured for ensuring an internal temperature of the sampling device is not less than a preset temperature, for example 50° C., thereby facilitating storing and intake of samples in a pulsed way. A microporous filter, for example a microstrainer, is disposed at the inlet of the sampling device and configured for filtering impurities such as dust or particles in the sample gas, so as to prevent the sampling gas path from being blocked by the dust or particles during sampling.

FIG. 2 is a structural schematic diagram of the pulsed sampling-based ion mobility spectrometer shown in FIG. 1 in an internal circulation state, where an arrow indicates a gas flow direction. The second three-way valve 105B is switched to its 0-position, such that under the action of the first pump 103A, gas flow within the ion migration tubes 101A, 101B flows via the gas outlet to the first buffer chamber 102A, the first pump 103A and the third three-way valve 104, and is filtered by the first purification filter 107A to enter the second buffer chamber 102B, and then respectively enter the migration gas circulation path and sample introduction carrier gas circulation path via the first flow control valve 106A and the second three-way valve 105B, so as to go back to the ion migration tube.

Figure 3:
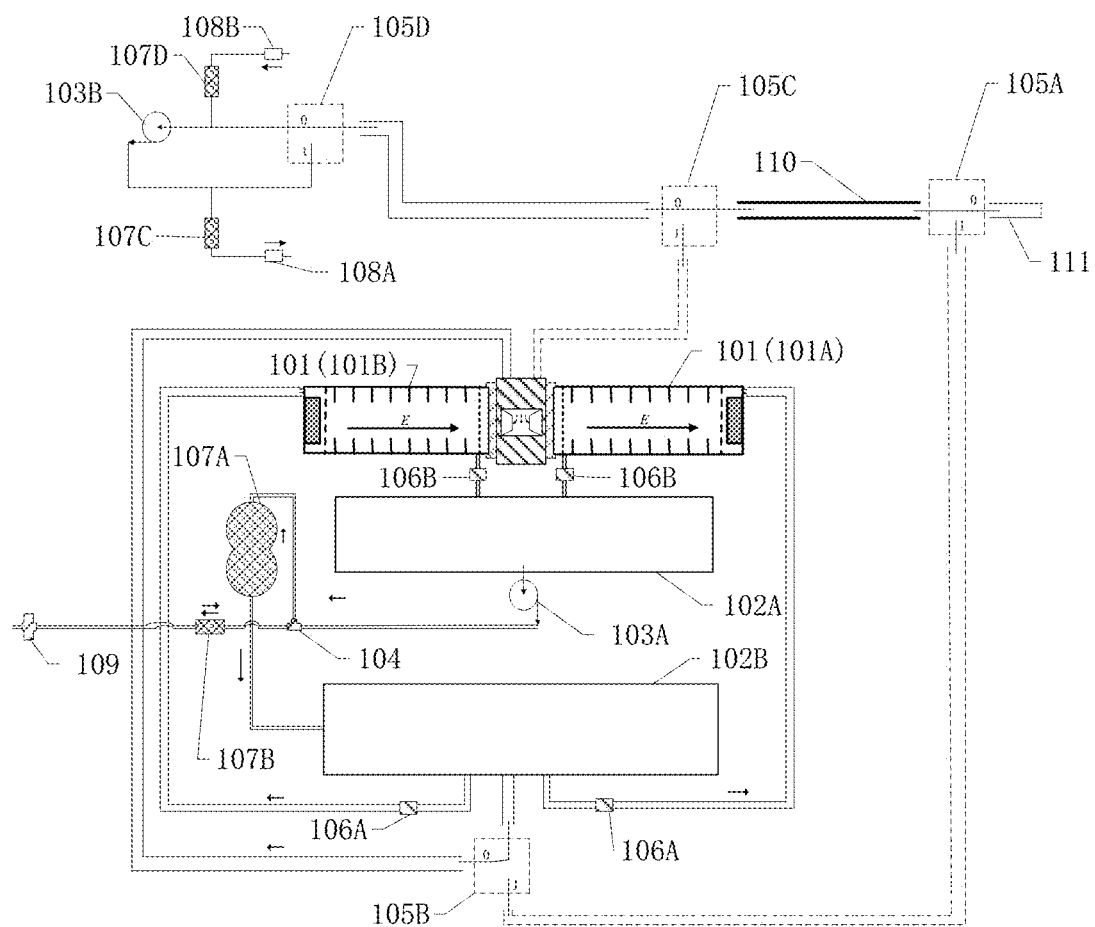
FIG. 3 is a structural schematic diagram of the pulsed sampling-based ion mobility spectrometer shown in FIG. 1 in a sampling state.

FIG. 3 is a structural schematic diagram of the pulsed sampling-based ion mobility spectrometer shown in FIG. 1 in a sampling state, where an arrow indicates a gas flow direction. The sampling device 111 is placed near the sample to be inspected, and the first three-way valve 105A, the fourth three-way valve 105C and the fifth three-way valve 105D are each switched to its 0-position, such that under the suction action of the second pump 103B, a gas sample passes through the sampling device 111, and via the first three-way valve 105A, flows into the sampling pipe 110. During pulsed sampling, the ion migration tube 101 is in a gas flow internal circulation state.

Figure 4:
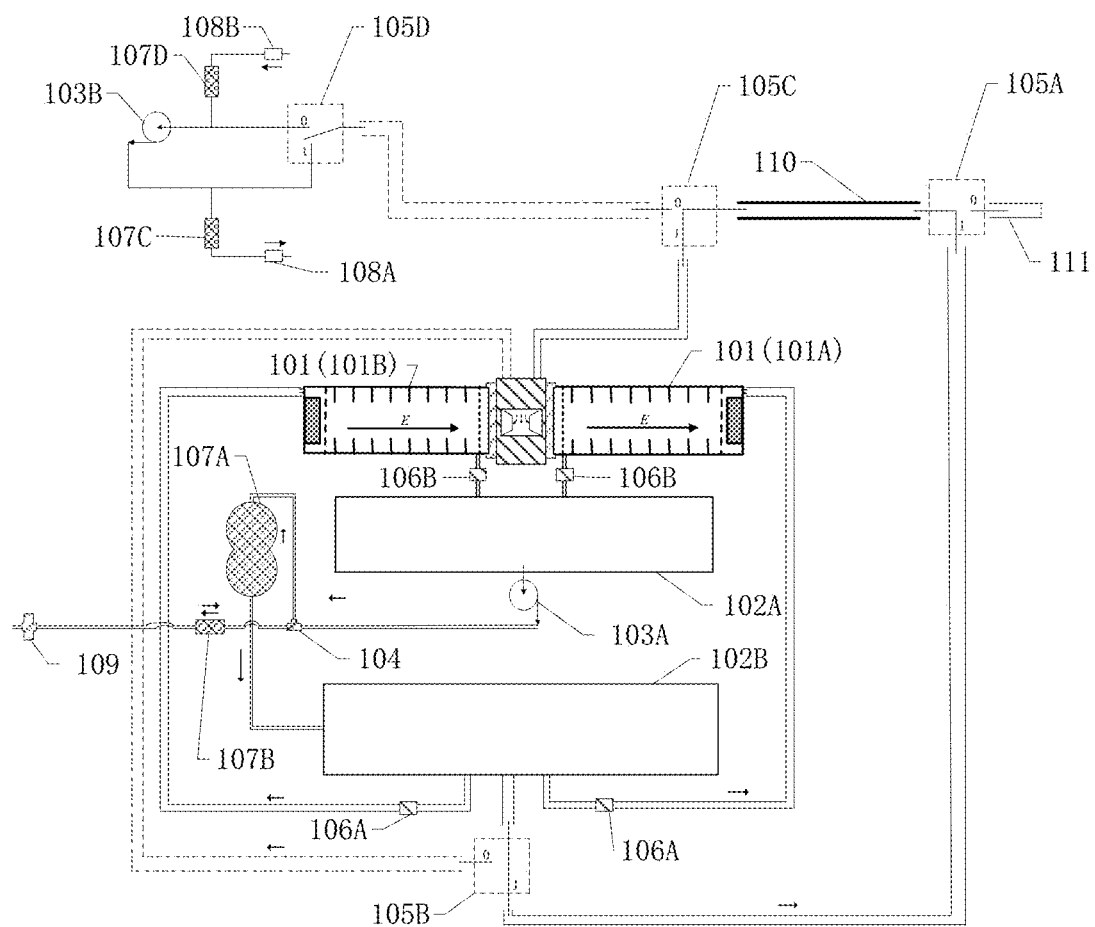
FIG. 4 is a structural schematic diagram of the pulsed sampling-based ion mobility spectrometer shown in FIG. 1 in a sample injecting state.

FIG. 4 is a structural schematic diagram of the pulsed sampling-based ion mobility spectrometer shown in FIG. 1 in a sample injecting state, where an arrow indicates a gas flow direction. The ion migration tube 101 is switched from the gas flow internal circulation state to the sample injecting state, that is, the second three-way valve 105B, the first three-way valve 105A and the fourth three-way valve 105C are switched simultaneously from the previous 0-positions to the 1-positions, such that under the action of the first pump 103A, the sample introduction carrier gas for ion migration passes through the second buffer chamber 102B, and via the second three-way valve 105B and the second three-way valve 105A, enters the sampling pipe 110, so as to carry the sample gas temporarily stored in the sampling pipe 110, via the fourth three-way valve 105C, into the ionization reaction zone within the ion migration tube 101.

FIG. 5 is a structural schematic diagram of the pulsed sampling-based ion mobility spectrometer shown in FIG. 1 in a gas blowing and cleaning state, where an arrow indicates a gas flow direction. (1) Gas suction cleaning process: the first three-way valve 105A, the fourth three-way valve 105C and the fifth three-way valve 105D are switched simultaneously to the 0-positions, and the second pump 103B operates continuously, such that clean air is sampled by the sampling device 111 and flows via the first three-way valve 105A to the sampling pipe 110 and passes through the fourth three-way valve 105C and the fifth three-way valve 105D, the second pump 103B, the third purification filter 107C and the air resistor 108A to be discharged, while cleaning the pipes and valve assembly through which it passes. (2) Gas blowing cleaning process: the first three-way valve 105A and the fourth three-way valve 105C are switched to the 0-positions while the fifth three-way valve 105D is switched to the 1-position, such that environment gas passes through the air resistor 108B and is purified and filtered by the fourth purification filter 107D, and then passes through the second pump 103B, the fifth three-way valve 105D, the fourth three-way valve 105C, the sampling pipe 110, the first three-way valve 105A and the sampling device 111 to be discharged, while cleaning the pipes and valve assembly through which it passes. It is noted that in the gas blowing cleaning process, the blown gas is purified and filtered, thus this may be applicable in harsher environmental conditions.

According to another concept of the present disclosure, there is provided a sniffer, including the pulsed sampling-based ion mobility spectrometer as described above. Wherein, the technical effects of the sniffer are corresponding to those of the above ion mobility spectrometer, and will not be repeatedly described herein for avoiding unnecessary repetition.

In sum, with the ion mobility spectrometer and sniffer including the above ion mobility spectrometer provided by the present disclosure, the trace pulsed sampling of the inspected sample can be achieved by using the valve assembly. Such direct trace pulsed sampling and intake method can, on one hand, improve the detection sensitivity of the instrument, and on the other hand, ensure that under the same detection limit, the sampling and intake amounts of the sample are low, and that the harsh external environment is also difficult to affect the performance of the instrument. In addition, the sampling gas path designed also has a gas suction cleaning function or a gas blowing cleaning function, which can assist cleaning of the equipment and improve the working efficiency of the instrument.

What is claimed is:

1. A pulsed sampling-based ion mobility spectrometer, wherein comprising:

an ion migration tube provided with a gas inlet into which a sample gas and a carrier gas flow, a gas outlet from which a gas flows out and a migration gas inlet into which a migration gas flows;
a sampling gas path in which a sampling device is arranged, the sampling device comprising a sampling head and a sampling pipe, the sampling head having an outlet in communication with an inlet of the sampling pipe, the sampling gas path being configured to temporarily store the sample gas collected by the sampling head in the sampling pipe;
a sample introduction gas path having two ends in communication with the gas inlet and the gas outlet of the ion migration tube respectively, the sampling pipe being connected in parallel to the sample introduction gas path, the sample introduction gas path being configured to introduce the carrier gas within the ion migration tube into the sampling pipe and to carry the sample gas temporarily stored in the sampling pipe into the ion migration tube; and
a valve assembly configured to only allow gas to flow from the sampling device to the sampling pipe in a sampling state, and to only allow gas to flow from the ion migration tube via the sampling pipe back to the ion migration tube in a sample introduction state.

2. The ion mobility spectrometer according to claim 1, wherein the valve assembly comprises a first three-way valve having a first port in communication with the outlet of the sampling device, a second port in communication with the gas outlet of the ion migration tube and a third port in communication with the inlet of the sampling pipe.

3. The ion mobility spectrometer according to claim 2, wherein further comprising a circulation gas path including a migration gas circulation path and a sample introduction carrier gas circulation path, the migration gas circulation path having two ends in communication with the gas outlet and the migration gas inlet of the ion migration tube respectively so as to introduce the migration gas into the ion migration tube from a rear end thereof, the sample introduction carrier gas circulation path having two ends in communication with the gas outlet and the gas inlet of the ion migration tube respectively so as to introduce the carrier gas into the ion migration tube from a rear end thereof.

4. The ion mobility spectrometer according to claim 3, wherein the ion migration tube includes an integrated dual-mode full-ceramic migration tube, and there are provided two said migration gas circulation paths having outlet ends in communication with migration gas inlets of two ion migration tubes of the integrated dual-mode full-ceramic migration tube in a one-to-one correspondence.

5. The ion mobility spectrometer according to claim 3, wherein a first flow control valve is arranged in the migration gas circulation path to control a gas flow in the migration gas circulation path.

6. The ion mobility spectrometer according to claim 3, wherein further comprising a first pump provided downstream of the ion migration tube in a gas flow direction and configured to drive a gas flow.

7. The ion mobility spectrometer according to claim 6, wherein further comprising a first buffer chamber arranged in series in the sample introduction gas path between the ion migration tube and the first pump.

8. The ion mobility spectrometer according to claim 7, wherein further comprising a second flow control valve arranged in series in the sample introduction gas path between the ion migration tube and the first buffer chamber.

9. The ion mobility spectrometer according to claim 8, characterized by further comprising a second buffer chamber arranged in series in the sample introduction gas path between the first pump and the first three-way valve;
preferably, an inlet end of the migration gas circulation path and an inlet end of the sample introduction carrier gas circulation path are both in communication with a gas exhaust port of the second buffer chamber, and the second port of the first three-way valve is in communication with the gas exhaust port of the second buffer chamber.

10. The ion mobility spectrometer according to claim 9, wherein
the valve assembly further comprises a second three-way valve,
the inlet end of the sample introduction carrier gas circulation path is in communication with the sample introduction gas path via the second three-way valve at a connection position between the second buffer chamber and the first three-way valve, and
the second three-way valve is configured to only allow a part of the gas to flow from the second buffer chamber through the sample introduction gas path to the sampling pipe in the sample introduction state, and to only allow the gas to flow from the second buffer chamber through the sample introduction carrier gas circulation path to the ion migration tube in an internal circulation state.

11. The ion mobility spectrometer according to claim 9, wherein further comprising a first purification filter arranged in the sample introduction gas path between the first pump and the second buffer chamber and configured to filter gas flowing through the sample introduction gas path.

12. The ion mobility spectrometer according to claim 11, wherein further comprising a gas replenishing/discharging path for replenishing gas into the ion migration tube or for discharging gas from the ion mobility spectrometer, the gas replenishing/discharging path having a first end in communication with the gas outlet of the ion migration tube and a second end in communication with an external environment.

13. The ion mobility spectrometer according to claim 12, wherein a second purification filter is arranged in the gas replenishing/discharging path.

14. The ion mobility spectrometer according to claim 13, wherein,
the valve assembly further comprises a third three-way valve,
the first end of the gas replenishing/discharging path is in communication with the sample introduction gas path via the third three-way valve at a connection position between the first pump and the first purification filter, and
the third three-way valve is configured to only allow gas to flow from the first pump to the first purification filter in the sample introduction state, to only allow gas to flow from the first pump to the second purification filter in a gas discharging state, and to only allow gas to flow from the second purification filter to the first pump in a gas replenishing state.

15. The ion mobility spectrometer according to claim 14, wherein a water trap filter is further arranged in the gas replenishing/discharging path between the second purification filter and the external environment.

16. The ion mobility spectrometer according to claim 1, wherein a second pump is further arranged in the sampling gas path to drive gas flow.

17. The ion mobility spectrometer according to claim 16, wherein further comprising a gas suctioning and cleaning path having two ends being in communication with an outlet of the second pump and an external environment respectively, the second pump being arranged at downstream of the sampling gas path in a gas flow direction;
wherein, the valve assembly further comprises a fourth three-way valve arranged in the gas suctioning and cleaning path between the second pump and the sampling pipe, the fourth three-way valve being configured to only allow gas to flow from the sampling pipe to the second pump in a gas suctioning and cleaning state and to only allow gas to flow from the sampling pipe to the ion migration tube in the sample introduction state; and
a third purification filter is arranged in the gas suctioning and cleaning path, and the gas suctioning and cleaning path is configured such that in a gas suctioning and cleaning state, an clean air flow flows through the sampling gas path and is discharged after being filtered by the third purification filter.

18. The ion mobility spectrometer according to claim 17, wherein further comprising a gas blowing and cleaning path having two ends being in communication with an inlet of the second pump and the external environment respectively,
wherein, a fourth purification filter is arranged in the gas blowing and cleaning path, and the gas blowing and cleaning path is configured such that in a gas blowing and cleaning state, a gas flow filtered by the fourth purification filter flows to the sampling gas path so as to clean the sampling gas path.

19. The ion mobility spectrometer according to claim 18, wherein,
the valve assembly further comprises a fifth three-way valve arranged in the sampling gas path between the second pump and the fourth three-way valve, and
the fifth three-way valve is configured to only allow gas to flow from the sampling pipe to the second pump in the gas suctioning and cleaning state, and to only allow gas to flow from the second pump to the sampling pipe in the gas blowing and cleaning state.

20. A sniffer, wherein comprising the ion mobility spectrometer of claim 1.

* * * * *